(12) United States Patent
Barritt et al.

(10) Patent No.: US 10,958,528 B2
(45) Date of Patent: *Mar. 23, 2021

(54) HYBRID LEO/HAPS CONSTELLATION FOR FIXED BROADBAND

(71) Applicant: Loon LLC, Mountain View, CA (US)

(72) Inventors: Brian Barritt, San Jose, CA (US); Mauro Goncalves Filho, Los Gatos, CA (US)

(73) Assignee: Loon LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/717,519

(22) Filed: Dec. 17, 2019

(65) Prior Publication Data

US 2020/0136918 A1 Apr. 30, 2020

Related U.S. Application Data

(63) Continuation of application No. 16/251,632, filed on Jan. 18, 2019, now Pat. No. 10,554,499, which is a
(Continued)

(51) Int. Cl.
*H04L 12/24* (2006.01)
*H04W 40/20* (2009.01)
(Continued)

(52) U.S. Cl.
CPC .............. *H04L 41/12* (2013.01); *H04B 10/11* (2013.01); *H04B 10/118* (2013.01);
(Continued)

(58) Field of Classification Search
CPC ... H04B 10/11; H04B 10/118; H04B 10/1129; H04L 41/12; H04L 43/0882; H04L 43/16; H04W 8/22; H04W 24/02; H04W 40/20
(Continued)

(56) References Cited

U.S. PATENT DOCUMENTS 6,018,659 A 1/2000 Ayyagari
8,116,632 B2 2/2012 Miniscalco et al.
(Continued)

OTHER PUBLICATIONS

"International Search Report and Written Opinion for application No. PCT/US2019/020215 dated Jun. 12, 2019", 7 pages.
(Continued)

*Primary Examiner* — Dalzid E Singh
(74) *Attorney, Agent, or Firm* — Botos Churchill IP Law

(57) ABSTRACT

The disclosure provides for a system that includes a network controller configured to determine a network configuration of a network and cause the network to implement the network configuration. The network controller may be configured to determine that an overall link bandwidth for a particular geographic area is less than a set bandwidth amount based on link bandwidth information for possible links directly connected to the particular geographic area. Based on a difference between the overall link bandwidth and the set bandwidth amount, the network controller may be configured to determine additional links to connect to the particular geographic area in a given network configuration of the network. The network controller may then send instructions to the plurality of nodes of the network to cause the plurality of nodes to implement the given network configuration and transmit client data at the given point in time.

20 Claims, 10 Drawing Sheets

Related U.S. Application Data continuation of application No. 15/916,646, filed on Mar. 9, 2018, now Pat. No. 10,193,761.

(51) Int. Cl.
*H04W 8/22* (2009.01)
*H04B 10/118* (2013.01)
*H04L 12/26* (2006.01)
*H04W 24/02* (2009.01)
*H04B 10/112* (2013.01)
*H04B 10/11* (2013.01)

(52) U.S. Cl.
CPC ...... *H04B 10/1129* (2013.01); *H04L 43/0882* (2013.01); *H04L 43/16* (2013.01); *H04W 8/22* (2013.01); *H04W 24/02* (2013.01); *H04W 40/20* (2013.01)

(58) Field of Classification Search
USPC .......................................... 398/121
See application file for complete search history.

(56) References Cited

U.S. PATENT DOCUMENTS

| | | | |
|---|---|---|---|
| 8,190,147 B2 | 5/2012 | Kauffman et al. | |
| 8,194,569 B2 | 6/2012 | Shorty et al. | |
| 8,401,466 B2 | 3/2013 | Bidigare et al. | |
| 8,913,894 B2 | 12/2014 | Coleman et al. | |
| 8,989,586 B2 | 3/2015 | Arnold et al. | |
| 9,042,734 B2 | 5/2015 | Makowski et al. | |
| 9,270,372 B2 * | 2/2016 | Miniscalco | H04B 7/18504 |
| 9,369,198 B2 | 6/2016 | Beals et al. | |
| 9,438,341 B2 * | 9/2016 | Brumley, II | G06N 5/022 |
| 9,503,176 B2 | 11/2016 | Beals et al. | |
| 10,193,761 B1 * | 1/2019 | Barritt | H04B 10/118 |
| 2002/0181059 A1 | 12/2002 | Christopher | |
| 2007/0104222 A1 * | 5/2007 | Luss | H04L 47/762 370/468 |
| 2009/0103452 A1 | 4/2009 | Horvath | |
| 2013/0303218 A1 * | 11/2013 | Teller | H04L 47/829 455/507 |
| 2014/0015694 A1 * | 1/2014 | Teller | B64B 1/40 340/946 |
| 2017/0300353 A1 * | 10/2017 | Yu | H04L 29/08 |
| 2017/0373915 A1 * | 12/2017 | Zhang | H04L 69/166 |

OTHER PUBLICATIONS

Barritt, et al., "SDN Enhancements for LEO Satellite Networks", 34th AIAA International Communications Satellite Systems Conference, International Communications Satellite Systems Conferences (ICSSC), Oct. 2016, 10 pages.

Barritt, et al., "Temporospatial SDN for Aerospace Communications", AIAA Space 2015 Conference and Exposition, AIAA Space Forum, 2015, 5 pages.

Kingsbury, et al., "Optical Communications for Small Satellites", Thesis submitted to the Department of Aeronautics and Astronautics on Aug. 6, 2015, 127 pages.

Wikipedia, "Forwarding Information Base (FIB)", Available online at: <https://en.wikipedia.org/wiki/Forwarding_information_base>, retrieved on May 24, 2017, 4 pages.

\* cited by examiner

|  |  | Ground station 107a | Ground station 107b | Ground station 107b | HAP 110a | HAP 110b | HAP 110c | HAP 110d | HAP 110e | HAP 110f |
|---|---|---|---|---|---|---|---|---|---|---|
| Current time | Availability | Y | Y | Y | Y | Y | Y | Y | Y | Y |
|  | Location |  |  |  | Location A |  | Location C | Location D |  |  |
|  | Weather |  |  |  | Clear weather |  | Clear weather |  |  |  |
| Future time | Availability | Y |  | Y | Y | Y | Y | Y | Y |  |
|  | Location |  |  |  | Location B |  |  | Location E |  |  |
|  | Weather |  |  |  |  |  |  | Thunderstorm |  |  |

400A
FIGURE 4A

|  | | Link 130 | Link 131 | Link 132 | Link 133 | Link 134 | Link 140 | Link 141 | Link 142 | Link 143 | Link 144 | Link 145 |
|---|---|---|---|---|---|---|---|---|---|---|---|---|
| Current time | Availability | Y | N | Y | Y | Y | Y | Y | Y | Y | Y | Y |
|  | Bandwidth | High | | Low | Low | High | High | Low | High | High | High | High |
| Future time | Availability | Y | N | Y | Y | Y | N | Y | Y | Y | Y | Y |
|  | Bandwidth | High | | Low | Low | High | | Low | High | High | High | High |

HYBRID LEO/HAPS CONSTELLATION FOR FIXED BROADBAND

CROSS-REFERENCE TO RELATED APPLICATIONS

The present application is a continuation of U.S. patent application Ser. No. 16/251,632, filed Jan. 18, 2019, which is a continuation of U.S. patent application Ser. No. 15/916,646, filed Mar. 9, 2018, now U.S. Pat. No. 10,193,761 issued on Jan. 29, 2019, the disclosures of which are incorporated herein by reference.

BACKGROUND

Information can be transmitted over directional point-to-point networks, such as aerospace and other mobile networks. In such networks, links can be formed between pairs of nodes by aiming transceivers of each node pair towards each other. In some implementations, nodes may include non-geostationary satellite orbit (NGSO) satellites or other high-altitude platforms (HAPs) that are in motion relative to the Earth.

BRIEF SUMMARY

Aspects of the disclosure provide for a system. The system includes a network controller that is configured to receive information from a plurality of nodes of a network, the plurality of nodes including a first node that is in motion relative to a second node. Based on the received information, the network controller is also configured to generate a data structure representing available nodes and possible links in the network based on the received information, the data structure including link bandwidth information, and then determine a topology of the network for a given point in time based on the generated data structure. The network controller is also configured to receive client data information from one or more client devices from a particular geographic area, determine that an overall link bandwidth for the particular geographic area is less than a set bandwidth amount based on the link bandwidth information for one or more of the possible links directly connected to the particular geographic area, and determine one or more additional links to connect to the particular geographic area in a given network configuration of the network based on a difference between the overall link bandwidth and the set bandwidth amount. In addition, the network controller is configured to send instructions to the plurality of nodes of the network to cause the plurality of nodes to implement the given network configuration and transmit client data at the given point in time.

In one example, the set bandwidth amount is a fixed amount. Additionally or alternatively, the set bandwidth amount is variable based on the received client data information. In this example, the received client data information optionally includes an amount of client data to be transmitted from the particular geographic area over a period of time. Also in this example, the network controller is optionally also configured to determine that a time for transmitting the amount of client data is greater than a set threshold amount of time, and determine the set bandwidth amount based on how much greater the time for transmitting the amount of client data is than the set threshold amount of time.

In yet another example, the one or more additional links is configured to communicate using a first type of communication link with the first node and a second type of communication link with the second node. The system optionally also includes the plurality of nodes. Additionally or alternatively, the plurality of nodes includes one or more ground stations and one or more high-altitude platforms. The plurality of nodes is also optionally configured to perform free-space optical communication. In a further example, the network controller is also configured to generate a series of network configurations that includes the given network configuration and a schedule for the series of network configurations. IN this example, the instructions to the plurality of nodes include the schedule for the series of network configurations.

Other aspects of the disclosure provide for a computer-implemented method. The method includes using one or more processors to receive information from a plurality of nodes of a network, the plurality of nodes including a first node that is in motion relative to a second node. The method also includes using the one or more processors to generate a data structure representing available nodes and possible links in the network based on the received information. The data structure includes link bandwidth information. Then, the method includes using the one or more processors to determine a topology of the network for a given point in time based on the generated data structure. In addition, the method includes using the one or more processors to receive client data information from one or more client devices from a particular geographic area, determine that an overall link bandwidth for the particular geographic area is less than a set bandwidth amount based on the link bandwidth information for one or more of the possible links directly connected to the particular geographic area, and determine one or more additional links to connect to the particular geographic area in a given network configuration of the network based on a difference between the overall link bandwidth and the set bandwidth amount. Then, the method includes sending, by the one or more processors, instructions to the plurality of nodes of the network to cause the plurality of nodes to implement the given network configuration and transmit client data at the given point in time.

In one example, determining that the overall link bandwidth is less than the set bandwidth amount includes determining the set bandwidth amount based on the received client data information. In this example, the received client data information optionally includes an amount of client data to be transmitted from the particular geographic area over a period of time. Further in this example, the method additionally includes using the one or more processors to determine that a time for transmitting the amount of client data is greater than a set threshold amount of time, and determine the set bandwidth amount based on how much greater the time for transmitting the amount of client data is than the set threshold amount of time.

Optionally, sending instructions to the plurality of nodes includes sending instructions to cause the one or more additional links to communicate using a first type of communication link with the first node and a second type of communication link with the second node. In this example, the first type of communication link is a free-space optical communication link. The plurality of nodes in a further example includes one or more ground stations and one or more high-altitude platforms. In yet another example, the method also includes generating a series of network configurations that includes the given network configuration and a schedule for the series of network configurations. The instructions to the plurality of nodes in this example include the schedule for the series of network configurations.

Further aspects of the disclosure provide for a non-transitory, tangible computer-readable storage medium on which computer readable instructions of a program are stored. The instructions, when executed by one or more processors, cause the one or more processors to perform a method. The method includes receiving information from a plurality of nodes of a network, where the plurality of nodes includes a first node that is in motion relative to a second node; generating a data structure representing available nodes and possible links in the network based on the received information, where the data structure includes link bandwidth information; determining a topology of the network for a given point in time based on the generated data structure; receiving client data information from one or more client devices from a particular geographic area; determining that an overall link bandwidth for the particular geographic area is less than a set bandwidth amount based on the link bandwidth information for one or more of the possible links directly connected to the particular geographic area; determining one or more additional links to connect to the particular geographic area in a given network configuration of the network based on a difference between the overall link bandwidth and the set bandwidth amount; and sending instructions to the plurality of nodes of the network to cause the plurality of nodes to implement the given network configuration and transmit client data at the given point in time.

In another example, determining that the overall link bandwidth is less than the set bandwidth amount includes determining the set bandwidth amount based on the received client data information.

BRIEF DESCRIPTION OF THE DRAWINGS

FIGS. 4A and 4B show example tables 400A and 400B, respectively, in accordance with aspects of the disclosure.

DETAILED DESCRIPTION

Overview

Figure 1:
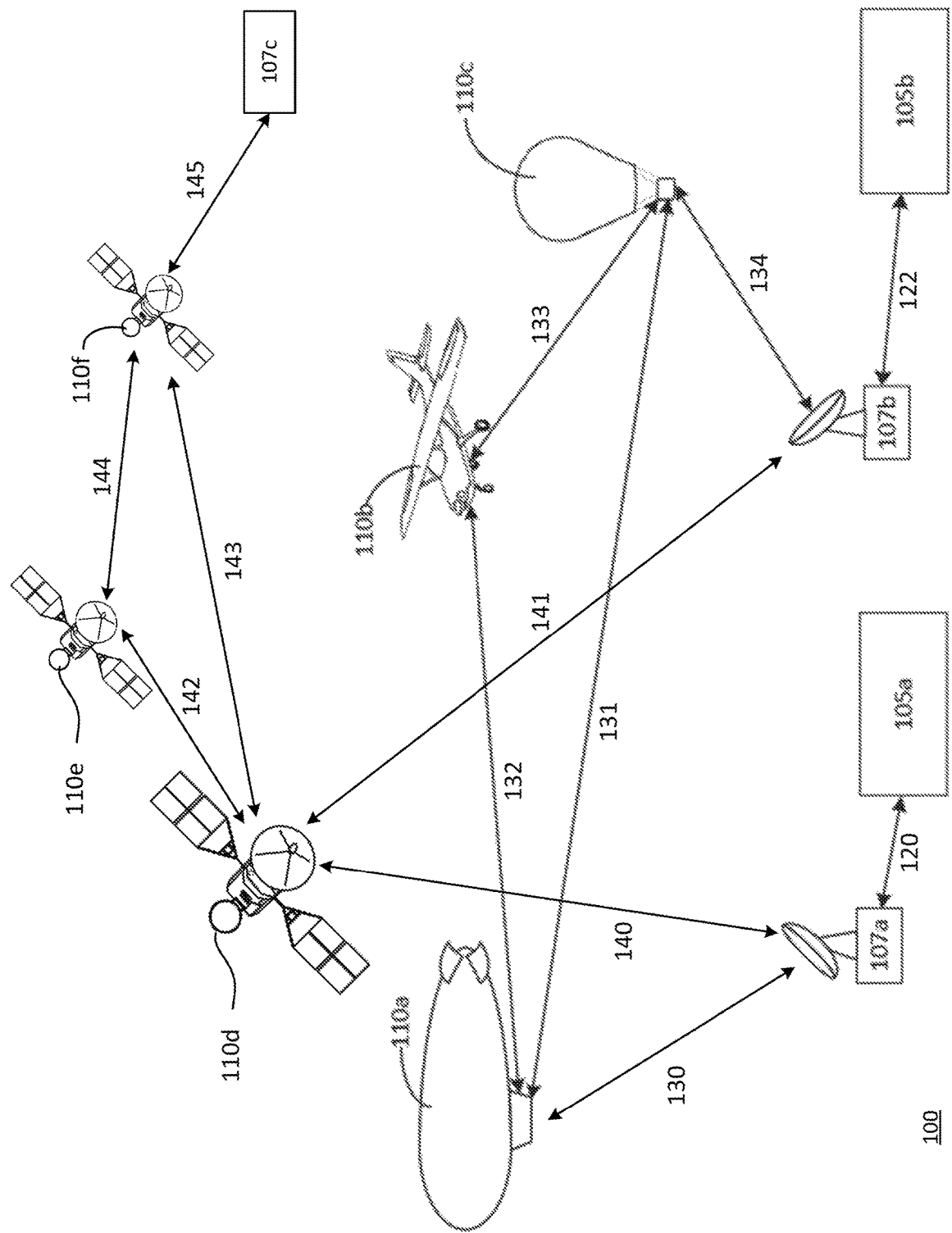
FIG. 1 is a pictorial diagram of an example directional point-to-point network 100 in accordance with aspects of the disclosure.

The technology relates to a Temporospatial Software-Defined Networking (TS-SDN) operating system configured for use in an aerospace communication network. Particularly, the TS-SDN operating system may be used in aerospace communication networks that include non-geostationary satellite orbit (NGSO) satellites, such as Low Earth Orbit (LEO) satellites, or other high-altitude platforms (HAPs) as nodes. The TS-SDN operating system may schedule and implement the services and applications that control, monitor, and reconfigure the network layer and switching functionality.

In operation, a TS-SDN controller may periodically update a list of available nodes, such as, for example, NGSO satellites configured for free-space optical communication (FSOC), and available routes, or flows, through the aerospace network. The list may include a schedule of the available nodes and available flows. The availability of nodes and flows may be based on at least a forecast of the trajectory of moving nodes. The available flows through the aerospace network from a given region to all other available regions may be advertised from an Software-Defined Networking (SDN)-enabled router in the given region. The TS-SDN controller may automatically schedule the tasking of FSOC terminals on the HAPs or ground stations and transmit the schedule to the FSOC terminals to synchronize changes to the aerospace network according to the schedule.

The TS-SDN controller may schedule the tasking of the FSOC terminals in the network based at least in part on a difference between an amount of bandwidth servicing a given ground station or a given geographic area and a set bandwidth amount. The set bandwidth amount may be a fixed amount, or may be variable based on an amount of client data being transmitted to or from the given ground station or client devices or ground stations in the given geographic area. For greater amounts of client data, the given ground station or geographic area has a higher density of client data which means that the client data transmission for individual client devices in that geographic area will be slowed down or in some instances stopped. This can cause delays, annoyance, and other issues at those client devices. To compensate for these delays and reduce the burden on the rest of the network, the set bandwidth amount may be increased when the amount of client data would be transferred over a longer amount of time than a set threshold amount of time using the flows available in the network.

One or more HAPs may then be adjusted to form a communication link with the given ground station or the client devices or ground stations in the given geographic area to add an amount of bandwidth to provide the set bandwidth amount to the given ground station or the given geographic area. In some implementations, the one or more HAPs may form a first type of communication link with the given ground station or the client devices or ground stations in the given geographic area and may form a second type of communication link with another HAP of the network. Adjusting the one or more HAPs may include forming a communication link between a first HAP in a first network and a second HAP in a second network. Effectively, the first network and the second network may function as a single overall network. The overall network may expand the bandwidth available to the given ground station or the given geographic area and/or provide faster service for the given ground station or the given geographic area than just the first network or the second network alone.

Example Systems

FIG. 1 is a pictorial diagram of an example directional point-to-point network 100. The network 100 is a directional point-to-point computer network consisting of nodes mounted on various land- and air-based devices, some of which may change position with respect to other nodes in the network 100 over time. For example, the network 100 includes nodes associated with each of two land-based datacenters 105a and 105b (generally referred to as datacenters 105), nodes associated with each of three ground stations 107a, 107b, and 107c (generally referred to as ground stations 107), and nodes associated with each of six airborne high altitude platforms (HAPs) 110a-110f (generally referred to as HAPs 110). As shown, HAP 110a is a blimp, HAP 110b is an airplane, HAP 110c is a balloon, and HAPs 110d-110f are satellites. In some implementations, a client device may be a node of the network 100 or may be directly or indirectly connected to a HAP of the network 100. For example, a client device may form a communication link with HAP 110d or, similar to datacenter 105a, may for a communication link with ground station 107a.

In some embodiments, nodes in network 100 may be equipped to perform FSOC, making network 100 an FSOC network. Additionally or alternatively, nodes in network 100 may be equipped to communicate via radio-frequency signals or other communication signal capable of travelling through free space. Arrows shown between a pair of nodes represent possible communication links 120, 122, 130-134, 140-145 between the nodes. Link 120 may be between datacenter 105a and ground station 107a, and link 122 may be between datacenter 105b and ground station 107b. HAP 110a may be linked to ground station 107a, HAP 110b, and HAP 110c via links 130, 131, and 132, respectively. HAP 110c may be linked to HAP 110b and ground station 107b via links 133 and 134, respectively. HAP 110d may be linked to ground station 107a, ground station 107b, HAP 110e, and HAP 110f via links 140, 141, 142, and 142, respectively. HAP 110f may be linked to HAP 110e and ground station 107c via links 144 and 145, respectively.

The network 100 as shown in FIG. 1 is illustrative only, and in some implementations the network 100 may include additional or different nodes. For example, in some implementations, the network 100 may include additional HAPs, which may be balloons, blimps, airplanes, unmanned aerial vehicles (UAVs), satellites, or any other form of high altitude platform. As further shown in FIG. 1, network 100 may be configured into two subnetworks. A first subnetwork may include HAPs 110a, 110b, and 110c in communication with one another and ground stations 107a and 107b, including possible links 130-134. A second subnetwork may include HAPS 110d, 110e, and 110f in communication with one another and ground stations 107a, 107b, and 107c, including possible links 140-145.

In some implementations, the network 100 may serve as an access network for client devices such as cellular phones, laptop computers, desktop computers, wearable devices, or tablet computers. The network 100 also may be connected to a larger network, such as the Internet, and may be configured to provide a client device with access to resources stored on or provided through the larger computer network. In some implementations, HAPs 110 can include wireless transceivers associated with a cellular or other mobile network, such as eNodeB base stations or other wireless access points, such as WiMAX or UMTS access points. Together, HAPs 110 may form all or part of a wireless access network. HAPs 110 may connect to the datacenters 105, for example, via backbone network links or transit networks operated by third parties. The datacenters 105 may include servers hosting applications that are accessed by remote users as well as systems that monitor or control the components of the network 100. HAPs 110 may provide wireless access for the users, and may forward user requests to the datacenters 105 and return responses to the users via the backbone network links.

Figure 2:
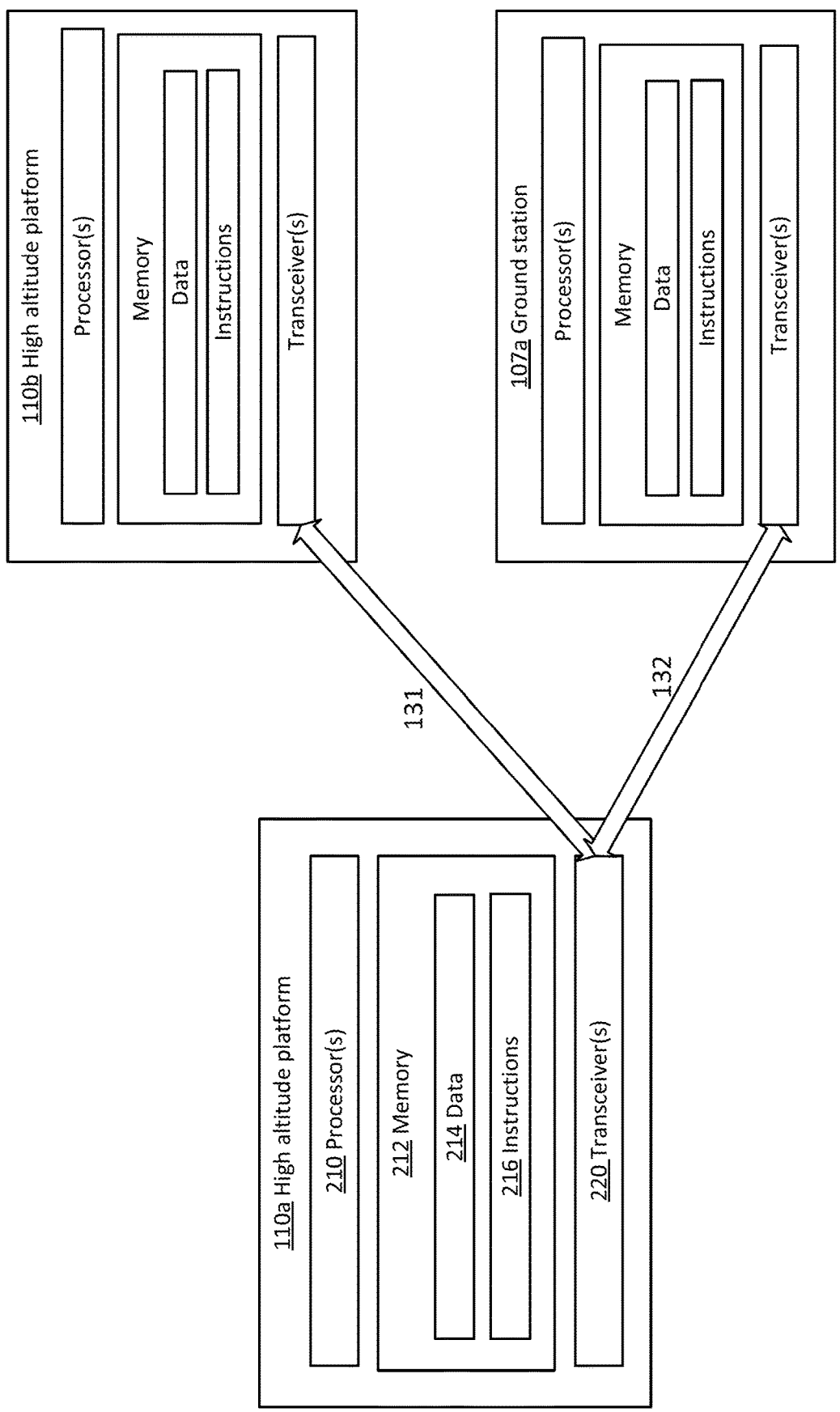
FIG. 2 is a functional diagram of a portion 200 of the network 100 shown in FIG. 1 in accordance with aspects of the disclosure.

As shown in FIG. 2, each node, such as ground stations 107 and HAPs 110 may include one or more transceivers configured to create one or more links, such as links 120, 122, 130-134, 140-145, between a given HAP 110 and another node in the network. Referring to HAP 110a, each of the nodes, such as ground stations 107 and HAPs 110 of network 100, may include one or more processors 210, memory 212, and one or more transceivers 220. For the sake of clarity and simplicity, only ground station 107a and HAPs 110a, 110b are shown in FIG. 2. However, other ground stations and HAPs in the network may have the same or as similar configuration as ground station 107b or HAPS 110a, 110b.

The one or more processors 210 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 2 functionally illustrates the one or more processors 210 and memory 212 as being within the same block, it will be understood that the one or more processors 210 and memory 212 may actually comprise multiple processors and memories that may or may not be stored within the same physical housing. Accordingly, references to a processor or computer will be understood to include references to a collection of processors or computers or memories that may or may not operate in parallel.

Memory 212 stores information accessible by the one or more processors 210, including data 214, and instructions 216, that may be executed by the one or more processors 210. The memory may be of any type capable of storing information accessible by the processor, including non-transitory and tangible computer-readable mediums containing computer readable instructions such as a hard-drive, memory card, ROM, RAM, DVD or other optical disks, as well as other write-capable and read-only memories. The system and method may include different combinations of the foregoing, whereby different portions of the data 214 and instructions 216 are stored on different types of media. In the memory of each node, such as memory 212 of HAP 110a, a forwarding information base or forwarding data structure, such as a database or table, may be stored that indicate how signals received at each node should be forwarded, or transmitted. For example, the forwarding table stored in memory 212 may indicate that a signal received from ground station 107a should be forwarded to HAP 110d.

Data 214 may be retrieved, stored or modified by the one or more processors 210 in accordance with the instructions 216. For instance, although the system and method is not limited by any particular data structure, the data 214 may be stored in computer registers, in a relational database as a table having a plurality of different fields and records, XML documents or flat files. The data 214 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 214 may comprise any information sufficient to identify the relevant information, such as numbers, descriptive text, proprietary codes, references to data stored in other areas of the same memory or different memories (including other network locations) or information that is used by a function to calculate the relevant data.

The instructions 216 may be any set of instructions to be executed directly (such as machine code) or indirectly (such as scripts) by the one or more processors 210. For example, the instructions 216 may be stored as computer code on the computer-readable medium. In that regard, the terms "instructions" and "programs" may be used interchangeably herein. The instructions 216 may be stored in object code format for direct processing by the one or more processors 210, or in any other computer language including scripts or collections of independent source code modules that are interpreted on demand or compiled in advance. Functions, methods and routines of the instructions 216 are explained in more detail below.

The one or more transceivers 220 may be mounted to actuators that can be controlled, or steered, to point in a desired direction. To form a link between two nodes, such as the node associated with the HAP 110a and the node associated with the HAP 110d, the transceivers of the respective nodes can be controlled to point in the direction of one another so that data can be sent and received between the nodes. In some implementations, the power of the signals transmitted by each transceiver can also be controlled by the one or more processors of respective nodes to facilitate formation of the links 120, 122, 130-134, 140-145 in the network 100 (see FIG. 1, for instance). For example, nodes that are separated by a relatively large distance can be configured to operate at a higher power to compensate for the reduction in signal-to-noise ratio that occurs over the distance separating the two nodes. Nodes that are spaced nearer to one another may be controlled to operate at a relatively lower power so as to save power.

Figure 3:
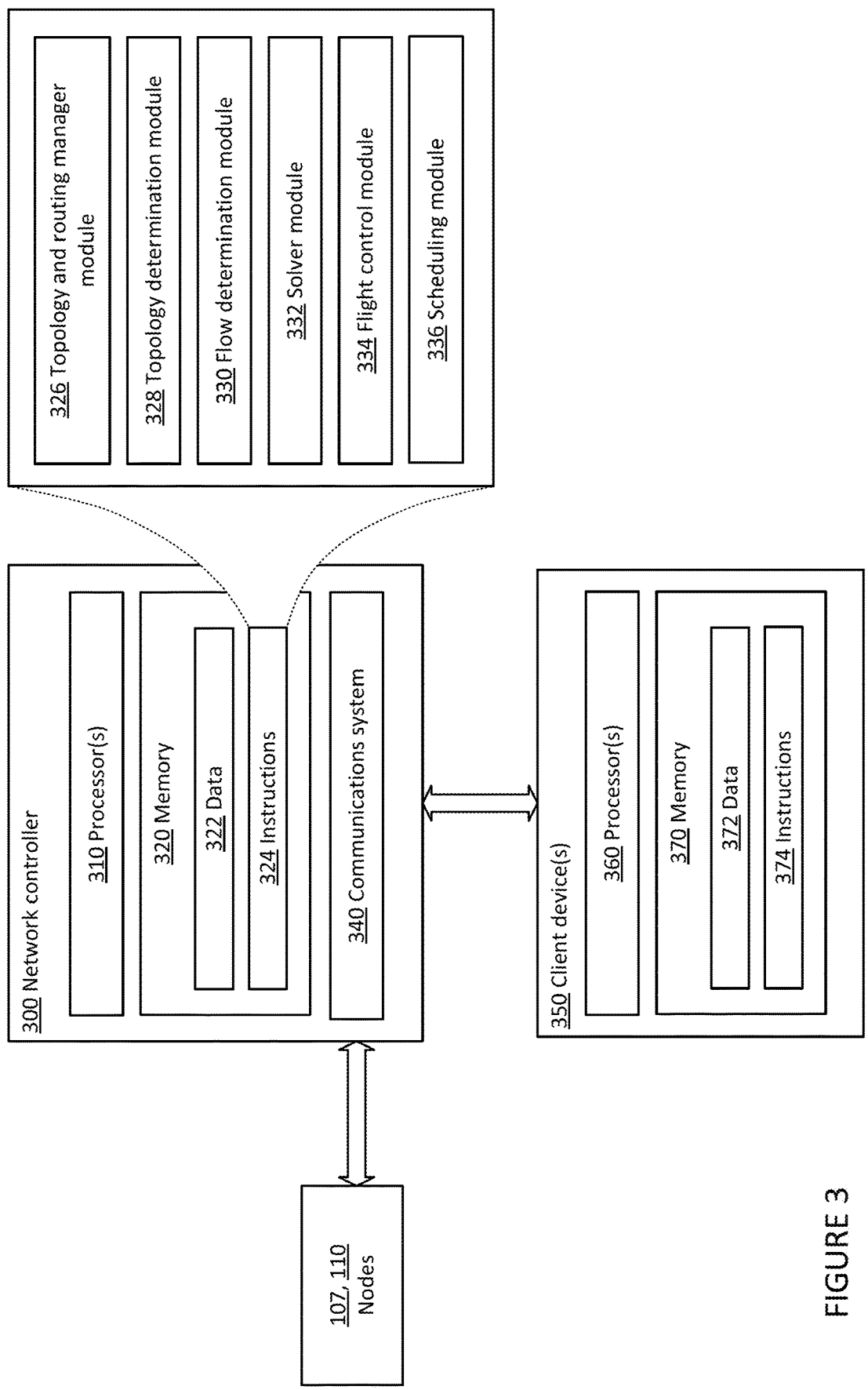
FIG. 3 is a functional diagram of a network controller 300 in accordance with aspects of the disclosure.

In some implementations, the network 100 can be an SDN that is controlled by an SDN controller, such as network controller 300 depicted in FIG. 3. The network controller 300 may be located at one of the network nodes or at a separate platform, such as, for example, in one of the datacenters 105. The nodes of the network 100 can be configured to communicate with one another using the steerable transceivers, such as the one or more transceivers 220. As the HAPs 110 move with respect to one another and with respect to the datacenters 105, ground stations 107, and other ground locations over time, some of the links shown in the block diagram of FIG. 1 may become infeasible. For example, the link 130 between the ground station 107a and the HAP 110a may not be feasible when the path of the HAP 110a brings the HAP 110a into a position in which it is out of range of the ground station 107a, or in which the earth is positioned between it and the ground station 107a. In other examples, weather events between the HAPs 110 and the datacenters 105, ground stations 107, and other ground locations may also render certain links unfeasible. Thus, due to the continuous movement of the HAPs 110, the topology of the network 100 may require regular (i.e. periodic) or irregular reconfiguration to maintain connectivity and to satisfy determined network flows.

FIG. 3 is a functional diagram of network controller 300. The network controller 300 may be configured to send control messages to the network 100 to configure the topology of the network 100, to pass routing information to the nodes 107, 110 of the network 100, and to schedule changes to the topology of the network 100 to transmit client data. As shown in FIG. 3, the network controller 300 may include one or more processors 310, memory, 320, and communications system 340. The one or more processors 310 may be similar to the one or more processors 210 described above.

Memory 320 may store information accessible by the one or more processors 310, including data 322 and instructions 324 that may be executed by processor 310. Memory 320, data 322, and instructions 324 may be configured similarly to memory 212, data 214, and instructions 216 described above. The data 322 may include a database, table, or other storage structure representing all of the available nodes and possible links in the network 100 at a given time or time frame, such as table 400A in FIG. 4A and table 400B in FIG. 4B. The tables 400A and 400B may have a column for every node and link in the network 100 and a row for a time or time frame. In some cases, the columns and the rows may be reversed. The tables 400A and 400B may also store, for each node and each link, scheduled times or time frames during which the node or link is available. Alternatively, a graph or other form of information organization may be used. The instructions 324 may include a topology and routing manager module 326, a topology determination module 328, a flow determination module 330, a solver module 332, a flight control module 334, and a scheduling module 336.

Returning to FIG. 3, the communications system 340 may be configured to communicate with the nodes 107, 110 of network 100 as well as one or more client devices 350. In some embodiments, the communication system 340 includes a Control to Data-Plane Interface (CDPI) driver configured to communicate with a CDPI agent at each of the nodes 107, 110. In addition, the communications system 340 of the network controller 300 may include one or more northbound interface (NBI) agents configured to communicate with an NBI driver at each client device 350 associated with one or more SDN applications. The communication system 340 may optionally or alternatively be configured to transmit and receive a signal via radio frequencies, optical frequencies, optical fiber, cable, or other communication means to and from the nodes 107, 110 in the network 100 and the one or more client devices 350.

Each client device 350 may be a personal computing devices or a server with one or more processors 360, memory 370, data 372, and instructions 374 similar to those described above with respect to the one or more processors 210 and 310, memories 212 and 320, data 214 and 322, and instructions 216 and 324. Personal computing devices may include a personal computer that has all of the components normally used in connection with a personal computer such as a central processing unit (CPU), memory (e.g., RAM and internal hard drives) storing data and instructions, an electronic display (e.g., a monitor having a screen, a small LCD touch-screen, a projector, a television, or any other electrical device that is operable to display information), user input (e.g., a mouse, keyboard, touch-screen or microphone), camera, speakers, a network interface device, and all of the components used for connecting these elements to one another. Personal computing devices may also include mobile devices such as PDAs, cellular phones, and the like. Indeed, client devices 350 may include any device capable of processing instructions and transmitting data to and from humans and other computers including general purpose computers, network computers lacking local storage capability, and set-top boxes for televisions. In some embodiments, client devices may be associated with one or more SDN applications and may have one or more NBI drivers.

Turning to the modules of the instructions 324 of FIG. 3, the topology and routing manager module 326 may cause the one or more processors 310 to interface between the network controller 300 and the network 100. Using the topology and routing manager module 326, the one or more processors 310 may receive information from each of the nodes within the network 100. For example, in some implementations, the topology and routing manager module 326 may cause the one or more processors 310 to receive information from each node 107, 110 in the network 100 corresponding to the current location of each node, the predicted path of each node, the current links associated with each node, the routing information stored by each node, and the current storage capacity, for instance how many free or available bits can be utilized if any, at each node. Information received from each node may also include weather conditions, turbulence, radiation, or other reports regarding other conditions that may affect FSOC between nodes. Each node also may send to the one or more processors 310 information corresponding to any failed links, which may occur due to unforeseen obstructions between nodes, turbulence at a node, or failure of one or more transceivers.

The topology and routing manager module 326 may also cause one or more processors 310 to receive predicted link metrics and conditions. For example, a predicted link metric may include a predicted value of a network performance metric for a hypothetical link that may be formed currently or in the future based on information received from the nodes 107, 110. Network performance metrics may include bandwidth capacity, latency, or link lifetime duration, and can be based on the predicted relative motion or trajectory of the nodes 107, 110 in the network 100. Link lifetime duration may represent the period of time during which a link is feasible in the network 100. Weather forecasts in node locations, predicted node locations or predicted links may also be received by the one or more processors 310 from the nodes 107, 110 or optionally from a remote system.

Using the topology and routing manager module 326, the one or more processors 310 may store the information received from the network 100 in the memory 320. For instance, the tables 400A and 400B, depicted in FIGS. 4A and 4B, respectively, represents all of the available nodes (FIG. 4A) and possible links (FIG. 4B) in the network 100 may be updated or annotated with information relevant for a particular node or link in the table. The annotations of the tables 400A and 400B may indicate availability of each node in the network 100, current and future locations of each node, current and future expected weather conditions, as well as a current amount of available storage at each of the nodes and a future (estimated) amount of available storage at each of the nodes in the network. In addition, the annotations of table may indicate the current and future availability of particular links as well as the current and future expected bandwidth for such links. Failed links and forecasted conditions may also be noted and stored in the tables 400A and 400B.

The topology determination module 328 may cause the one or more processors 310 to determine a current or future topology of the network 100. The determination of the current topology of the network 100 may be made based on the information received and stored by the one or more processors using the topology and routing manager module 326. For example, the topology determination module 328 may cause the one or more processors 310 to aggregate the information relating to the current location of each node 107, 110, the links 130-134, 140-145 formed between each pair of nodes, and any failed links that may exist within the network 100. The one or more processors 310 may receive this information through use of the topology and routing manager module 326, or may retrieve this information from the memory 320.

Additional information may also be used by the one or more processors 310 using the topology determination module 328 to determine the current topology of the network 100. Predicted link metrics received by the one or more processors 310 using the topology and routing manager module 326 and may also be used to determine the bandwidth, quality of service, and other characteristics of available links in the current topology. In some implementations, using the topology determination module 328, the one or more processors 310 may also receive information through using the flight control module 334 corresponding to the flight paths of the airborne network nodes, such as HAPs 110, at a particular time or over a particular time frame at or near the current time, and the determination of the current topology may be made based also on the received flight information.

To determine a future topology of the network 100, the one or more processors 310 may aggregate location information, predicted link conditions, flight information, available storage and/or weather forecasts related to a future time using the topology determination module 328. The one or more processor 310 may access the information stored in the tables 400A and 400B or elsewhere in the memory 320 regarding available nodes and links at the future time, location information, predicted link conditions, flight information, and/or weather forecasts. The information for the future time may be used by the one or more processors 310 to determine where nodes are predicted to be and what the availability of nodes and links and storage capabilities at each node are predicted to be at the future time.

The topology determination module 328 may cause the one or more processors 310 to store the current or future topology or other topology information in the memory 320, such as by generating and or updating the table 400A or 400B representing all of the available nodes and possible links in the network 100 and the scheduled times or time frames associated with each node or link.

The flow determination module 330 may cause the one or more processors 310 to determine all of the flows that are determined in the network 100 at a given time or time frame. A given flow may be one or more requirements for a routing path through the network 100. For example, each flow may comprise a start station, an end station, a time frame, a minimum bandwidth, or other requirement for transmission. The one or more processors 310 may determine the flows based on the topology information determined using the topology determination module 328 and/or information regarding characteristics of client data of the one or more client devices 350. The client data information may be received by the one or more processors 310 using the scheduling module 336 as described below from the one or more client devices 350 or a remote system. The client data information may include the sources and destinations for client data, an amount of client data to be transmitted, and/or a timing for transmission of client data. The amount of data may additionally or alternatively be an estimated average amount of data to be transmitted from or to a particular ground station or ground stations in a geographic area over a period of time.

The minimum bandwidth of a flow may be preset or predetermined by the one or more processors 310 given available system resources and link capabilities or alternatively, may be determined based on requirements included in the client data. Larger bandwidths may be set for flows transporting larger amounts of data. The one or more processors 310 may determine a flow between a start station and a destination station through the network capable of transmitting the amount of client data at the requested time. In some embodiments, the one or more processors 310 may also determine other information related to determined flows, such as the class of service or quality of service for each determined flow. The other information may be based on requirements received from the client device.

In some implementations, the flow determination module 330 may cause the one or more processors 310 to aggregate the client data from the one or more client devices 350 to determine the total amount of bandwidth required between each node pair in the network 100. The aggregated client data may be stored, for example, in the memory 320. Furthermore, the client data may be aggregated at a granular level. For example, the network data for each pair of nodes may be aggregated by class of service, quality of service, or any other relevant network traffic discriminator. The flows may be determined further based on any relevant network traffic discriminator.

In other cases, historical client data trends may be used to predict the client data amounts, sources, and destinations at a future point in time. The flow determination module 330 may cause the one or more processors 310 to determine a plurality of available flows between every node directly connectable to a client device at the future point in time. Directly connectable nodes, such as ground stations 107, may be able to communicate with a client device without use of the network 100. The predicted client data amounts between each node pair may be used to determine the bandwidth requirements between each node pair.

Alternatively, in the absence of client data information, the one or more processors 310 may determine a plurality of available flows between every node directly connectable to a client device at the current or future time. The determination of the plurality of available flows may be based on the current or future topology. In addition, the determination may be based on minimum system requirements.

The flow determination module 330 may cause the one or more processors 310 to store the determined flows in the memory 320. In some examples, the one or more processors 310 may annotate the table with the flows.

The solver module 332 may cause the one or more processors 310 to generate a network configuration or a schedule of network configurations based on the table stored in the memory. The network configuration may represent a feasible network topology that is capable of satisfying all determined network flows and may include a list of nodes and links that would be in use in the feasible network topology and a schedule of when the nodes and links would be in use. The schedule of network configurations may represent a feasible series of network topologies that are capable of satisfying all determined network flows. The feasible series of network topologies may include a list of nodes and links and a schedule of when the nodes and links would be in use for each network configuration in the schedule of network configurations. In some examples, the feasible series of network topologies includes a network topology during which data may be stored at a node having available storage and a next network topology in which the node forms a new connection or link with another node and transmits the data via the newly established link.

The network configuration(s) may be generated by the one or more processors 310 based on the topology for a given point in time in the table and on the network performance metrics of the topology at the given point in time. Various network performance metrics, such as, for example, link bandwidth, link latency, flow bandwidth, flow priority, link switching time (i.e., the time required to implement a new topology in the network 100), link duration, and/or topology duration, may be modeled as weighted constraints for the topology at the given point in time. In some embodiments, one or more network performance metrics may not be included in the table stored in the memory, but may be received from another module, another node, or from a remote system.

The one or more processors 310 may also compute routing paths for the determined flows over the topology represented by the network configuration. A given routing path may be one way to implement a given flow that satisfies the determined flow requirements and may include specific nodes and links in the network, or a list of hops between a series of nodes. In some examples, the given routing path may include a node having available storage that satisfies the determined flow requirement regarding an amount of data to be transmitted through the network. Data following the given routing path may be stored at the node for a period of time before travelling to a next hop.

In addition, information corresponding to a previous state of the network and a previous network topology may also be used to determine the network configuration or the schedule of network configurations. For example, the one or more processors 310 may generate the network configuration based on at least in part a number of changes from the previous network topology required for the network to implement the network configuration and an amount of time required for the network to make the number of changes. The one or more processors 310 may alternatively generate the schedule of network configurations based on at least in part a number of changes between network topologies of the network configurations in the schedule of network configurations and the amount of time between changes utilizing the information of routing tales such as the tables 400A and 400B. For example, changes may include steering a transceiver to point in a new direction or changing a forwarding table stored at a memory of a node. Steering the transceiver may take more take than changing the forwarding table stored at the memory of the node. The generated network configuration may require a number of changes is below a threshold number and/or the amount of time below a threshold amount of time.

For some pairs of subsequent network configurations in the schedule of network configurations, the difference between the earlier network configuration and the later network configuration may be a single change that may not involve changing the direction of transceivers, such as a routing change at a single node.

After the one or more processors 310 has generated the network configuration(s) and routing paths using the solver module 332, the one or more processors 310 may control the nodes of the network 100 according to the topology and routing manager module 326 to implement the topology represented by the generated network configuration by sending implementation instructions to the nodes to cause the nodes to form the links included in the generated network configuration (e.g., by steering their respective transceivers, adjusting their respective transmission power levels, setting their transmission and reception frequency bands, etc.) and update forwarding tables stored at the memory at each node according to the computed routing paths for the determined flows. Some forwarding tables may be updated with a schedule of changes based on the schedule of network configurations and may also instructions to store data at a node before a next hop.

The flight control module 334 may cause the one or more processors 310 to generate flight instructions for the airborne nodes, such as HAPs 110, regarding the flight paths of the airborne nodes. For example, the one or more processors 310 may be unable to determine a network configuration using the solver module 332 representing a network topology that is capable of satisfying all of the determined network flows. The one or more processors may determine that the reasons for this failure using the solver module 332 is that one or more of the airborne network nodes in the network 100 has travelled too far from the other network nodes to be able to form a link. In response, using the flight control module 334, the one or more processor 310 may generate and transmit flight instructions for the airborne nodes of the network 100 that cause the airborne nodes to alter their flight paths such that additional links may be formed. For example, the flight instructions may cause the airborne nodes to move closer to one another or to avoid obstructions. After the nodes have been repositioned according to the flight instructions generated by the one or more processors using the flight control module 334, an updated table may be created using the topology and routing manager module 326 or the topology determination module 328 based on the new locations of the network nodes. Then, the updated table may be processed by the one or more processors 310 using the solver module 332 to determine a network configuration.

The scheduling module 336 may cause the one or more processors 310 at the network controller 300 to interface with the one or more client devices 350. Using the scheduling module 336, the one or more processors 310 may receive from a client device 350 client data information to be transmitted through the network 100, such as, for example, the sources and destinations for the client data. Other information received from the client device 350 may include data related to client demand, such as amount of client data to be transmitted and a timing for transmission. The information may be stored in memory 320 and/or used according to the flow determination module 330 to determine the determined flows through the network 100.

After the determined flows are determined using the flow determination module 330 and the network configuration is generated using the solver module 332 as described above, the one or more processors 310 may generate routing instructions for transmitting the client data through the network 100 based on the table and the generated network configuration. These routing instructions may include a source location of the client data, a destination location of the client data, and a timing for the transmission of the client data. In some embodiments, the routing instructions may include storage instructions to a node to temporarily store data from a previous node to be transmitted to a next node. The routing instructions may include a schedule that may be stored at a node of the network in directly connectable with the client device 350 sending the client data. The one or more processors 310 may then send the routing instructions to the node directly connectable with the client device 350 to cause the node to receive and initiate transmission of the client data over the determined flow in accordance with the schedule.

In some embodiments where flows are determined without client data information, the scheduling module 336 may cause the one or more processors 310 to send a message to a client device of the one or more client devices 350 regarding indicating availabilities of flows through the network based on the determined flows determined using the flow determination module 330 and the network configuration generated using the solver module 332. The message may also include a time or a time frame at which the flows are available and/or a price for transmission of the data associated with each flow. Using the schedule module 336, the one or more processors 310 may receive a response from one of the one or more client devices 350 that includes a request to use one of the determined flows for transmitting client data. The one or more processors 310 may then send routing instructions to the one or more nodes to initiate transmission of the client data over the determined flow.

Example Methods

Figure 5:
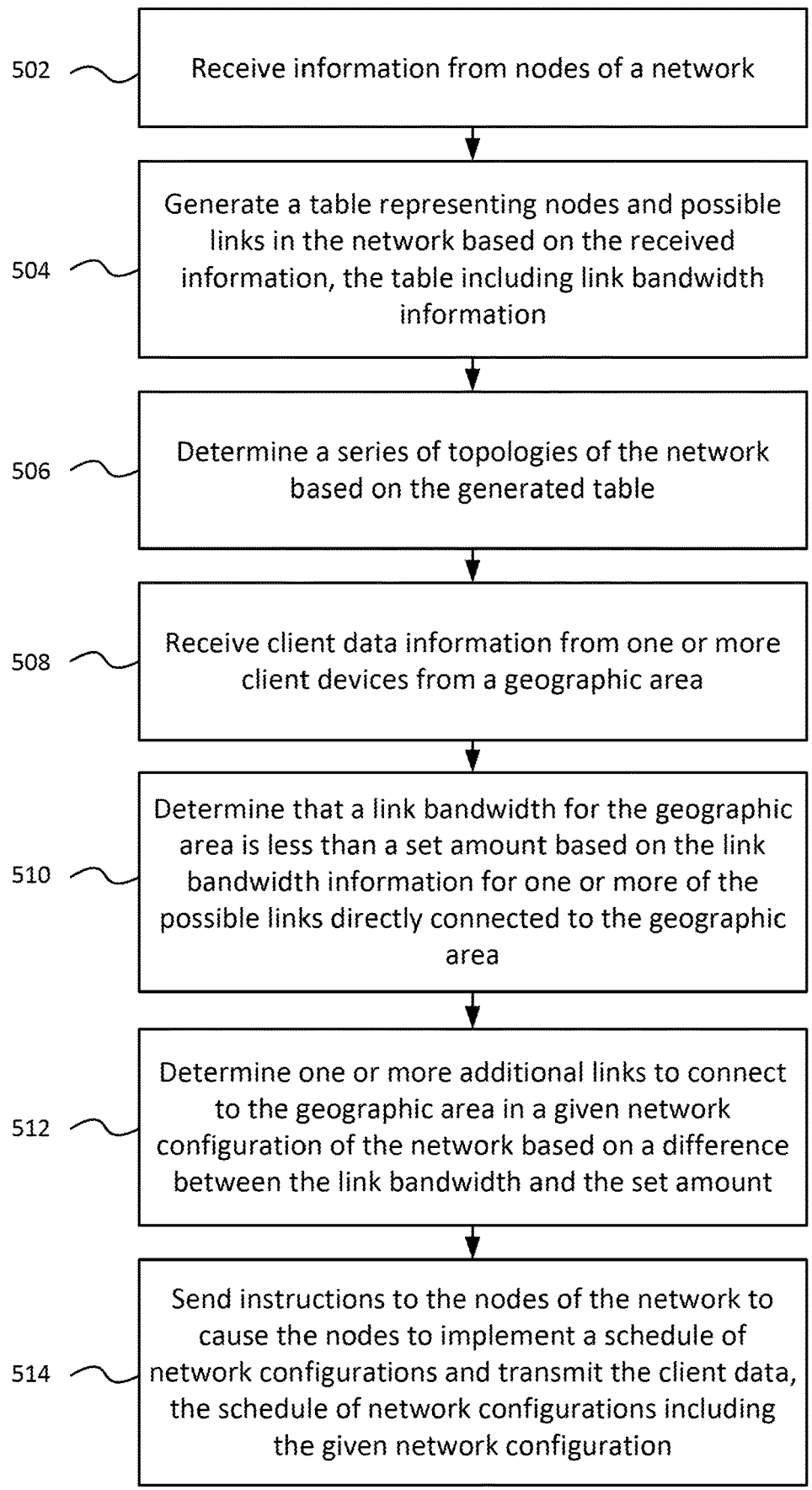
FIG. 5 is a flow diagram 500 of a method in accordance with aspects of the disclosure.

In FIG. 5, flow diagram 500 is shown in accordance with some of the aspects described above that may be performed by the one or more processors 310 of the network controller 300. While FIG. 5 shows blocks in a particular order, the order may be varied and that multiple operations may be performed simultaneously. Also, operations may be added or omitted.

At block 502, the one or more processors 310 of the network controller 300 may receive information from each of the nodes within the network 100 using the topology and routing manager module 326. Information may be related to the current or predicted condition of the nodes, weather, or links at a current time or a future time. In an example scenario, location A may be received as the current location of HAP 110a at a current time, location C may be received as the current location of HAP 110c at the current time, and location D may be received as the current location of HAP 110d. The weather conditions report from HAP 110a and 110c may indicate that the current weather conditions are clear at locations A and C. HAP 110a may also send an indication to the one or more processors 310 that HAP 110c has been unresponsive to requests to for a link 131. In addition, HAP 110a may be predicted to travel from location A to location B in one hour from the current time, and HAP 110d may be predicted to travel from location D to location E in one hour from the current time. The weather forecast for one hour from the current time may include a thunderstorm between location E and the location of ground station 107a.

For links in the network 100 or each subnetwork of the network 100, information related to bandwidth, latency, or link lifetime duration may be received by the one or more processors 310. For example, information for links in the network 100 may include how much bandwidth is available. Links 130, 134, 140, and 142-145 may have 10 Gbps available, and links 132, 133, and 141 may have 1 or 2 Gbps available. Because link 131 is not responsive, as indicated by HAP 110a, link 131 has no available bandwidth.

At block 504, a data structure representing available nodes and possible links in the network 100, such as tables 400A and 400B shown in FIGS. 4A and 4B, may be generated or updated based on the information received from the nodes of the network using the topology and routing manager module 326. As noted above, the tables 400A and 400B may be stored in the memory 320. In some implementations, the tables may be annotated with an assignment for each HAP or link for one or more subnetworks. In the example scenario, the table 400A may include the availability of nodes (yes/no), location of nodes (coordinates), weather at or near the nodes (clear/clouds/storms/ etc.), and other node information. For HAP 110a, the table 400A may be generated or updated to indicate that HAP 110a is available at location A where the weather is currently clear, and that HAP 110a is predicted to be at location B in one hour. For HAP 110c, the table 400A may be generated or updated to indicate that HAP 110c is available at location C where the weather is also currently clear. For HAP 110d, the table 400A may be generated or updated to indicate that HAP 110d is currently located at location D, and that HAP 110d is predicted to be at location E in one hour, where the weather will include a thunderstorm at that time between location E and the location of ground station 107a.

The table 400B in this example scenario may include the availability of links, the bandwidth of links, and other link information. In particular, the table 400B may be generated or updated to indicate that links 130, 132-134, and 140-145 are available at the current time, while link 131 is not available. For link 131 between HAPs 110a and 110c, the table may be generated or updated to indicate that the link 131 has failed at the current time based on the indication of unresponsiveness of HAP 110c to requests from HAP 110a. For link 140, the table 400B may be generated or updated to indicate that the link 140 has failed and therefore is not available at the future time. In addition, the table 400B may be generated or updated to indicate that links 130, 134, 140, and 142-145 have a high bandwidth, or 3 Gbps or more, and that links 132, 133, and 141 have a low bandwidth, or less than 3 Gbps. For link 140, the table 400B may be generated or updated to indicate that the link 140 does not have a bandwidth at the future time since it is not available at the future time.

Figure 6:
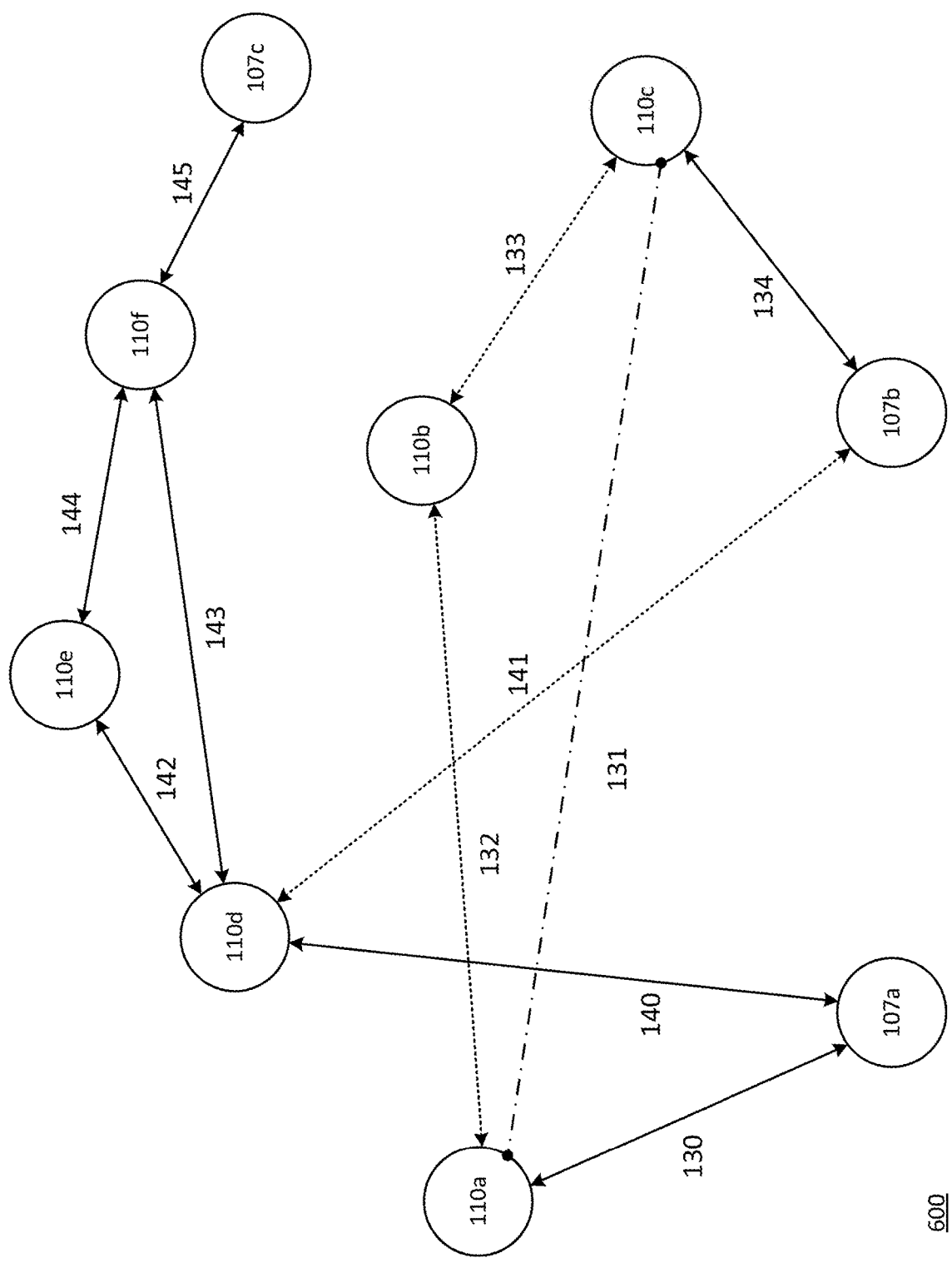
FIG. 6 is a functional diagram of a topology 600 of the network 100 shown in FIG. 1 in accordance with aspects of the disclosure.

At block 506, the one or more processors 310 may determine a current and/or future topology of the network based on the table using the topology determination module 328. For the example scenario, to determine the current topology, the one or more processors 310 may access the table in the memory 320 and determine from the table and the scheduled times associated with each node and link which nodes and links are available at the current time. According to the received information about HAPs 110a-110f, a current topology 600 may be determined as shown in FIG. 6. The current topology may be determined to include nodes 107, 110. Specifically, HAP 110a may be included in the current topology at location A, HAP 110c at location C, and HAP 110d at location D since these are the locations associated with the respective HAPs in the table for the current time.

As shown by the arrows in the current topology 600, links 130, 132-134, and 140-145 are included in the current topology, while the link 131 between HAP 110a and 110c, which is indicated as failed for the current time, is not included (shown as a dash-dot line without arrows in FIG. 6). In another example, if HAP 110c did not report its location at location C to one or more processors 310 but previously reported a flight path or a trajectory using the flight control module 334, the one or more processors 310 may determine that HAP 110c currently is at location C based on the flight path or trajectory and include HAP 100c in the current topology.

Each possible link 130, 132-134, and 140-145 in the current topology may also be labeled with link metrics, such as bandwidth, that are determined based on the received information. In the diagram of the current topology 600, solid lines indicate that links 130, 134, 140, and 142-144 are capable of higher bandwidths, such as 3 Gbps or more, and dashed lines indicate that links 132, 133, and 141 are capable of lower bandwidths, such as less than 3 Gbps.

Figure 7:
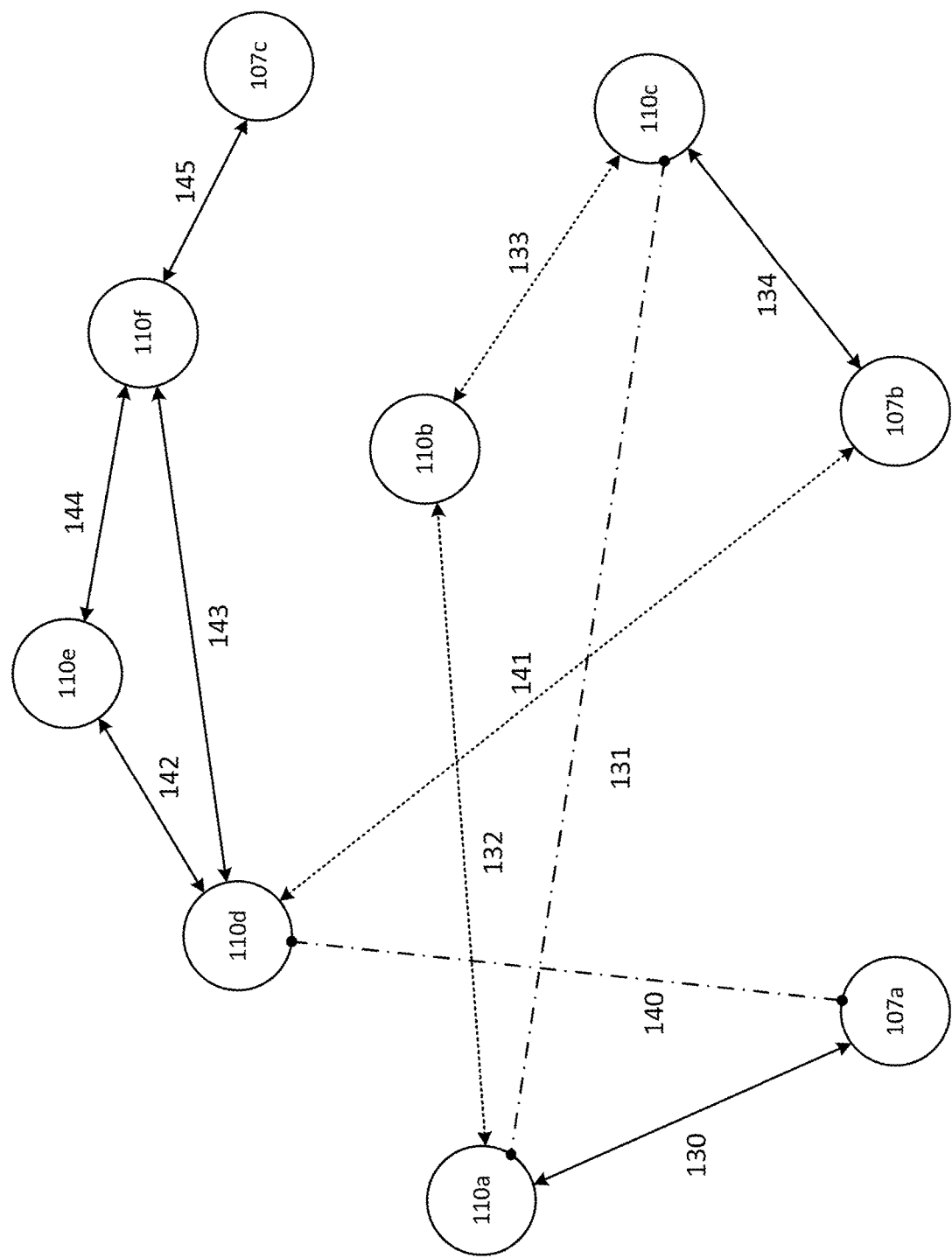
FIG. 7 is a functional diagram of another topology 700 of the network 100 shown in FIG. 1 in accordance with aspects of the disclosure.

Further in the example scenario, for a future time of one hour after the current time, a future topology 700 may be determined, as shown in FIG. 7. The one or more processors 310 may determine the location for HAP 110a at the future time to be location B and the location for HAP 110d at the future time to be location E based on the location information for the future time in the table. In addition, because the table includes an indication that the weather forecast includes a thunderstorm between location E and the location of ground station 107a as described above, the future topology may indicate that link 140 between HAP 110d and ground station 107a is unavailable at least for FSOC. As shown in FIG. 7, the dash-dot line of link 140 indicates that link 140 is predicted to be unavailable in the future topology for the future time.

Returning to FIG. 5, at block 508, information related to client data to be transmitted through network 100 may be received by the one or more processors 310 using the scheduling module 336. The client data information may be received from one or more client devices in proximity to a given ground station or in a geographic area that are in communication with the network controller 300. The client data information may include an amount of data, a source location, and a destination location of the client data, and a requested time of transmission. For example, in the example scenario, the received information may indicate that, for a first client data, the amount of client data is 10 Gb, the source location for the first client data is ground station 107b, the destination location is ground station 107c, and a requested time of transmission is the current time. The received information may also indicate that, for a second client data, the amount of client data is 10 Gb, the source location for the second client data is ground station 107a, the destination location is ground station 107c, and the requested time of transmission is the future time. The amount of data may additionally or alternatively be an estimated average amount of data to be transmitted from or to the given ground station or client devices or ground stations in the given geographic area. In some cases, the information also includes transmission requirements, such as bandwidth, class of service, quality of service, etc. In some embodiments, information related to client data may be predicted by the one or more processors 310 of the network controller 300 or by a remote system.

At block 510, the one or more processors 310 may determine that link bandwidth for the given ground station or the given geographic area is less than a set amount based on the client data information. In particular, the one or more processors 310 may compare the link bandwidth of the one or more links directly connected to the given ground station or the client devices or ground stations in the given geographic area in a possible flow for the client data through the network 100. A link is directly connected to the given ground station when the link is between a node and the given ground station. The set amount may be a fixed amount, such as 10 Gbps, 50 Gbps, 100 Gbps or other amount. Alternatively, the set amount may be variable depending on the demands on the network, such as the amount of client data to be transmitted through the network to or from the given ground station or the client devices or ground stations in the given geographic area. As the amount of client increases, the set amount may increase as well. For instance, bandwidth amount may be increased when the amount of client data would be transferred over a longer amount of time than a set threshold amount of time, such as five seconds, or more or less using the flows available in the network.

In the example scenario, to transmit the 10 Gb of first client data at the current time from ground station 107b to ground station 107c, the first client data must be transmitted via link 141 between ground station 107b and HAP 110d given the current topology 600 of the network 100. Link 141 is the only link in the current topology 600 connected to ground station 107b that provides service between ground stations 107b and 107c. The two possible flows between ground stations 107b and 107c are a first series of links 141, 143, and 145 or a second series of links 141, 142, 144, and 145. Therefore, the one or more processors 310 may determine whether the link bandwidth for transmitting the first client data is less than the set amount by comparing the bandwidth of link 141 with the set amount. As indicated in table 400B, link 141 has a low bandwidth of less than 3 Gbps at the current time. Assuming, that the set amount is 10 Gbps, the one or more processors 310 may determine that link 141 has a lower bandwidth than the set amount.

The one or more processors 310 may also determine whether the link bandwidth for transmitting the second client data is less than the set amount. To transmit the 10 Gb of second client data at the future time from ground station 107a to ground station 107c, the second client data must be transmitted via link 140 between ground station 107a and HAP 110d given the future topology 700 of the network 100. Link 141 is the only link in the future topology 700 connected to ground station 107a that provides service between ground stations 107a and 107c. The two possible flows between ground stations 107a and 107c are a first series of links 140, 143, and 145 or a second series of links 140, 142, 144, and 145. Therefore, the bandwidth of link 140 may be compared with the set amount. Because, as indicated in table 400B, link 140 is predicted to be unavailable, the one or more processors 310 may determine that link 141 has a lower bandwidth than the set amount of 10 Gbps.

At block 512, the one or more processors 310 may determine one or more additional links to connect to the given ground station or the client devices or ground stations in the given geographic area. The determination may be based on a difference between the link bandwidth available to the given ground station or the client devices or ground stations in the given geographic area for the possible flows and the set amount of bandwidth. In addition, the determination may be based on whether one or more nodes are available in the area and capable of forming a communication link with the given ground station or the client devices or ground stations in geographic area and a routing path to the destination location for the client data.

In some embodiments, the one or more processors 310 of network controller 300 may additionally or alternatively be configured to send an existing node of the network, such as, for example, HAP 110c, to the given geographic area in order to add coverage for the given geographic area. In that regard, the flight of HAP 110c may be terminated, for instance using any known flight termination approach, in order to land the HAP at or near the given geographic area. The existing node may be selected based on components in the existing node that may be used to construct an additional node, such as an additional ground station, at the given geographic area. In some implementations, more than one existing node may be selected in order to provide enough components to construct the additional node at the given geographic area. Sending the one or more existing nodes of the network to the given geographic area may include determining a landing location in or near the given geographic area where the existing node may land and be retrieved and providing instructions to the existing node to land at the determined landing location.

Figure 8:
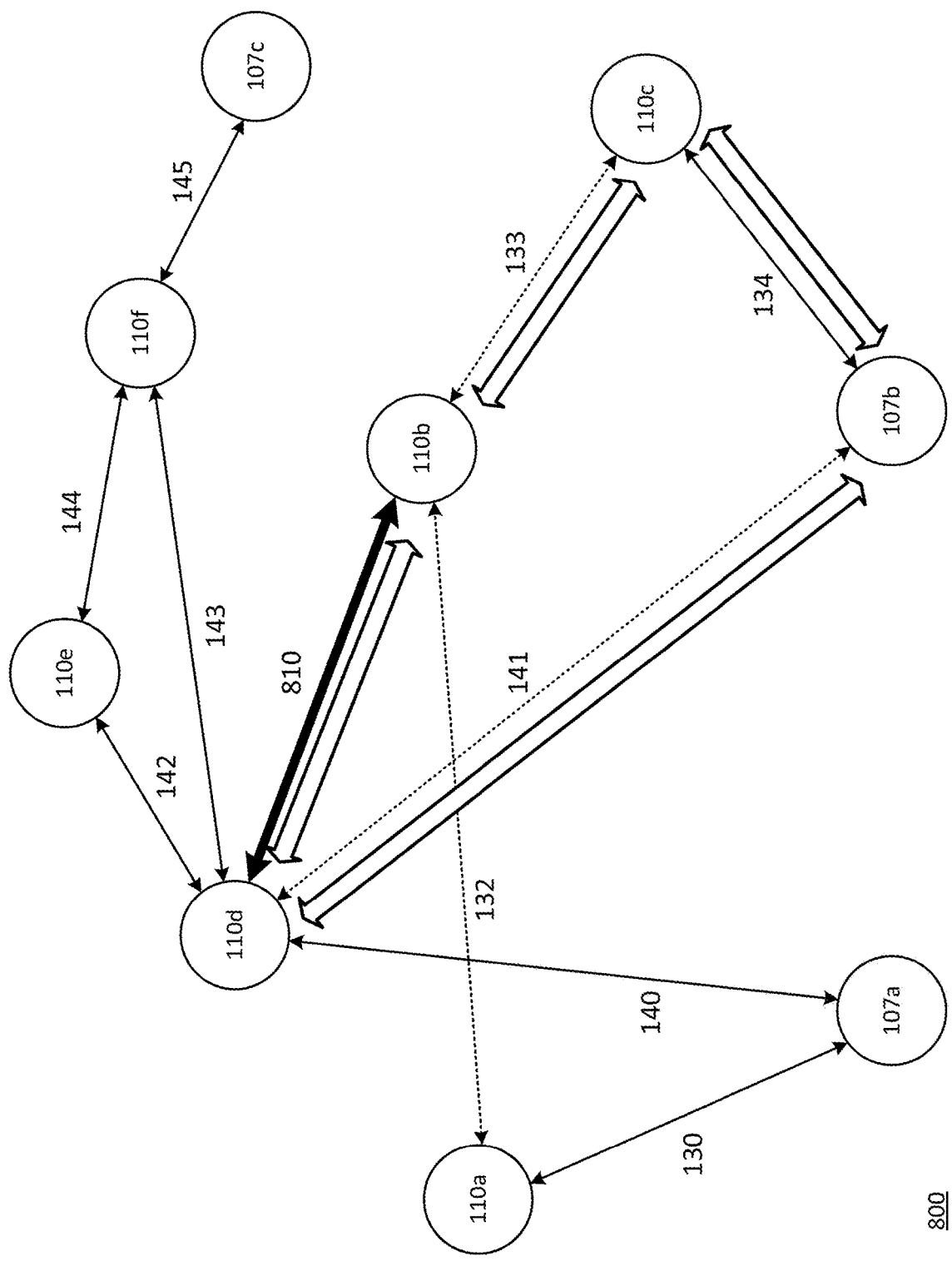
FIG. 8 is a functional diagram of a network configuration 800 of the network 100 in accordance with aspects of the disclosure.

As shown in FIG. 8, to facilitate transmission of the first client data from ground station 107b to ground station 107c at the current time, an additional link 810 between HAP 110d and HAP 110b may be formed. Adding link 810 provides two additional possible flows for the first client data, the first being the series of links 134, 133, 810, 143, and 145 and the second being the series of links 134, 133, 810, 142, 144, and 145. Link 134, which is directly connected to ground station 107b and HAP 110c, has a high bandwidth of 10 Gbps. The combination of links 141 and 134 therefore provides a bandwidth greater than 10 Gbps to ground station 107b, which is greater than the set amount of 10 Gbps.

A current network configuration 800 for the current topology 600 may be determined by the one or more processors 310 using the solver module 332. For example, the current network configuration 800 includes all of the available nodes and links at the current time, notably omitting link 131, as well as adding the additional link 810. The routing paths for the first client data may include at least two routing path portions from ground station 107b to HAP 110d, as indicated by the outlined arrows in FIG. 8. A first routing path portion is from ground station 107b through link 141 to HAP 110d and a second routing path portion is from ground station 107b through links 134, 133, and 810 to HAP 110d.

Figure 9:
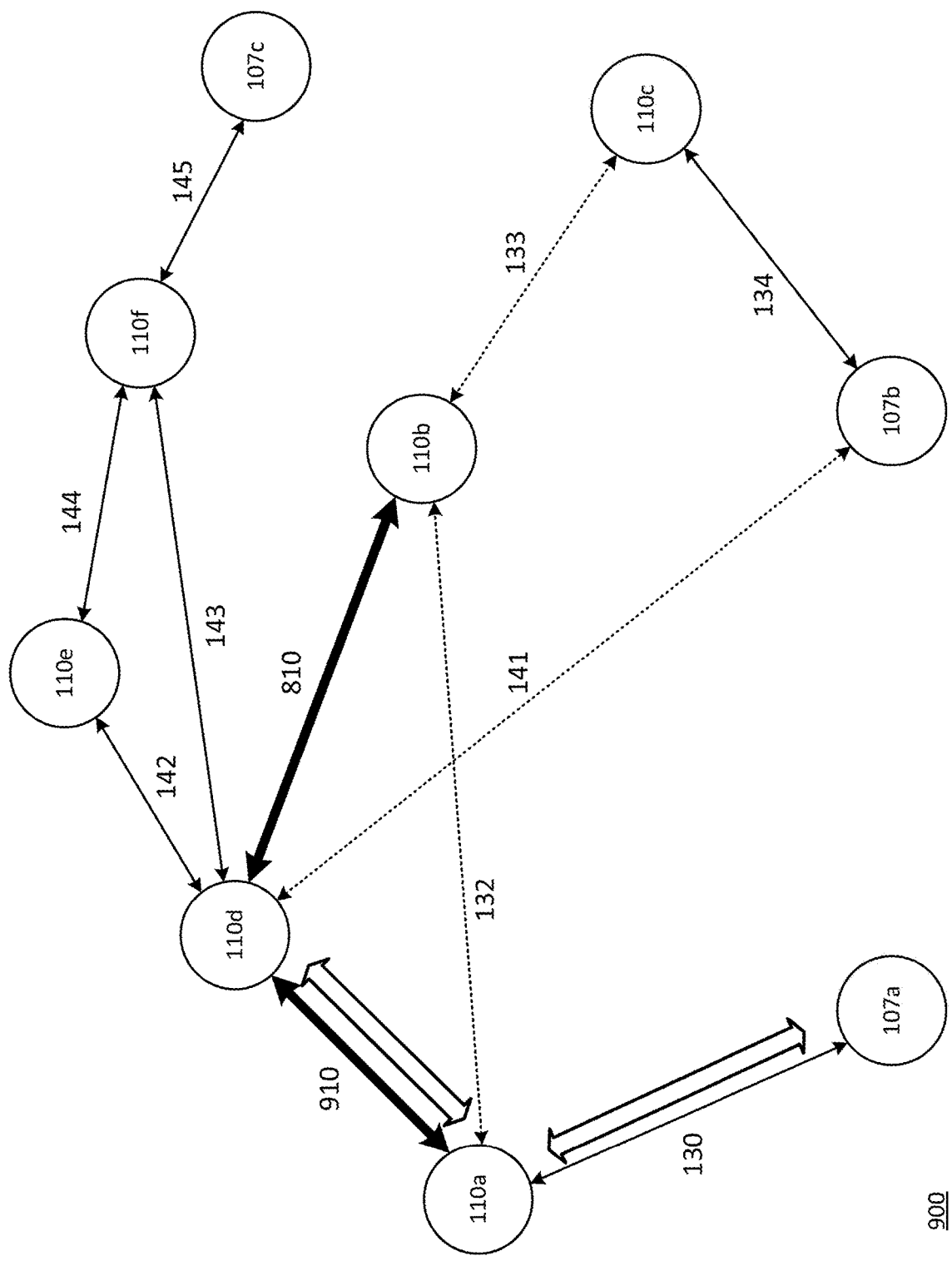
FIG. 9 is a functional diagram of another network configuration 900 of the network 100 in accordance with aspects of the disclosure.

As shown in FIG. 9, to facilitate transmission of the second client data from ground station 107a to ground station 107c at the future time, an additional link 910 between HAP 110d and HAP 110a may be formed. Because link 140 that connects ground station 107a with HAP 110d is not available at the future time, adding link 910 provides two additional possible flows for the first client data where there were none, the first being the series of links 130, 910, 143, and 145 and the second being the series of links 130, 810, 142, 144, and 145. Link 130, which is directly connected to ground station 107a and HAP 110a, has a high bandwidth of 10 Gbps. The set amount of 10 Gbps is therefore satisfied by link 130.

A future network configuration 900 for the future topology 700 may be determined by the one or more processors 310 using the solver module 332. For example, the future network configuration 900 includes all of the available nodes and links at the future time, notably omitting links 131 and 140, as well as adding the additional link 910. In some implementations the additional link 810 is also included in the future network configuration 900. The routing paths for the second client data may include at least the routing path portion from ground station 107a, through links 130 and 910, to HAP 110d, as indicated by the outlined arrows in FIG. 9.

As further shown in FIG. 5, at block 514, the one or more processors 310 may send implementation instructions to the nodes 107, 110 of the network 100 to cause the nodes of the network to implement a schedule of network configurations and transmit the client data using the topology and routing manager module 326 and/or the solver module 332. In the example scenario, for the current network configuration, the implementation instructions to nodes 107, 110 may include instructions to form additional link 810 and implement at least the routing path portions shown in FIG. 8. The implementation instructions may therefore include instructions to ground station 107b to point a transceiver of ground station 107b towards HAP 110d and 110c to form links 141 and 134, respectively; instructions to HAP 110d to point transceivers of HAP 110d towards ground station 107b and HAP 110b to form links 141 and 810, respectively; instructions to HAP 110b to point transceivers of HAP 110b towards HAP 110d and HAP 110c to form links 810 and 133, respectively; and instructions to HAP 110c to point transceivers of HAP 110c towards HAP 110b and ground station 107b to form links 133 and 134, respectively.

In some embodiments, the implementation instructions may also prepare the network for the future network configuration. In this case, the implementation instructions may include instructions to form the additional link 910 and implement at least the routing path portion shown in FIG. 9.

For example, the implementation instructions may include instructions to ground station 107a to point transceivers of ground station 107a towards where HAP 110a will be at the future time, or Location B, to form link 130; instructions to HAP 110a to point transceivers of HAP 110a towards ground station 107a and where HAP 110d will be at the future time, or Location E, to form links 130 and 910, respectively; and instructions to HAP 110d to point transceivers of HAP 110d towards where HAP 110a will be at the future time.

In some cases, one or more of the links in the current or future network configuration may already be formed, in which case no change to the direction of the transceivers is necessary. In addition, the implementation instructions to ground station 107a or 107b, the start station, may include routing instructions for receipt and transmission of the client data to be transmitted via routing paths through a given network configuration. The routing instructions may include the source location of the client data, the destination location of the client data, the timing for transmission, and/or the rate for transmission. For example, when the routing instructions for the first client data are received at ground station 107b, the ground station 107b may be caused to transmit the first client data at the current time through the current network configuration 800. When the routing instructions for the second client data are received at ground station 107a, the ground station 107a may be caused to transmit the second client data at the future time through the future network configuration 900.

For a network configuration generated for a future time or other point in time, the implementation instructions may include storing scheduled changes in the network 100, such as steering transceivers to implement new routing paths, at each node that may occur before transmitting client data at the future point in time. The implementation instructions may therefore include updating forwarding tables at each node with new routing paths and time or a time frame for implementing the new routing paths according to the future network configuration. When the time or time frame arrives, the nodes 107, 110 of network 100 may be caused to automatically implement the future network configuration according to the implementation instructions.

Alternatively, the one or more processors 310 of network controller 300 may request client data information from the one or more client devices 350 based on available bandwidth at the given ground station or the given geographic location using the scheduling module 336. To do so, the one or more processors 310 may determine how much bandwidth is available for the one or more links directly connectable with client devices, such as ground stations 107a, 107b, based on the current or future topology and/or the one or more possible additional links. After determining the available bandwidth for the one or more links directly connectable with client devices, the one or more processors 310 may use the scheduling module 336 send a message to a first client device of the one or more client devices 350 via the communication system 340. The messages may include the amount of available bandwidth, as well as a list of available flows that are between the node directly connectable to the first client device and all other nodes directly connectable to other client devices. In addition, the message may include a request for client data information for transmission through the network 100. A response may be received from the first client device including the client data information, which may then be used by the one or more processors 310 to generate and implement the network configuration using the solver module 332 as described above.

The features described above may provide for a reliable way for users to transmit data to different parts of the world. A communication network created using the features described may provide users with network coverage that is more robust to fade and outages. Because of this, end users of the communication network are more likely to use the network because it may provide more reliable transmission of data. In addition, because of the mobility of the nodes end users may therefore have increased accessibility to datacenters and other points of interest worldwide.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method for implementing a network configuration in a network, the method comprising:
    receiving, by one or more processors, link bandwidth information for possible routing paths in the network to or from nodes in a particular geographic area from one or more nodes of the network;
    determining, by the one or more processors, one or more additional links to form in a given network configuration of the network based on a difference between an overall link bandwidth and a set bandwidth amount;
    identifying, by the one or more processors, at least one node based on the determined one or more additional links; and sending, by the one or more processors, flight termination instructions to the at least one node of the network to cause the at least one node to terminate a flight of the at least one node.

2. The method of claim 1, further comprising determining, by the one or more processors, a landing location based on whether the at least one node can land and be retrieved, wherein the instructions are configured to cause the at least one node to land in the landing location.

3. The method of claim 2, wherein the landing location enables the at least one node to provide network services within the particular geographic area.

4. The method of claim 2, further comprising determining, by the one or more processors, a landing location within the particular geographic area, wherein the instructions are configured to cause the at least one node to land in the landing location.

5. The method of claim 1, further comprising determining, by the one or more processors, a landing location based on proximity to the particular geographic area, wherein the instructions are configured to cause the at least one node to land in the landing location.

6. The method of claim 1, wherein the identifying the at least one node is further based on one or more components in the at least one node that are usable in an additional node after landing.

7. The method of claim 6, wherein the at least one node is a high-altitude platform, and the additional node is a ground station.

8. The method of claim 6, wherein the additional node requires at least components for forming an additional link of the one more additional links.

9. The method of claim 1, wherein the at least one node includes a balloon.

10. The method of claim 1, further comprising:
    selecting a second node of the network based on the determined one or more additional links; and
    sending, by the one or more processors, flight termination instructions to the selected second node to cause the second node to terminate a flight of the second node.

11. A system comprising a network controller in communication with a plurality of nodes of a network, the network controller being configured to:
    receive link bandwidth information for possible routing paths in the network to or from nodes in a particular geographic area from one or more nodes of the network;
    determine one or more additional links to form in a given network configuration of the network based on a difference between an overall link bandwidth and a set bandwidth amount;
    identify at least one node based on the determined one or more additional links; and
    send flight termination instructions to the at least one node of the network to cause the at least one node to terminate a flight of the at least one node.

12. The system of claim 11, wherein the network controller is further configured to determine a landing location based on whether the at least one node can land and be retrieved, wherein the instructions are configured to cause the at least one node to land in the landing location.

13. The system of claim 12, wherein the landing location enables the at least one node to provide network services within the particular geographic area.

14. The system of claim 12, wherein the network controller is further configured to determine a landing location within the particular geographic area, wherein the instructions are configured to cause the at least one node to land in the landing location.

15. The system of claim 11, wherein the network controller is further configured to determine a landing location based on proximity to the particular geographic area, wherein the instructions are configured to cause the at least one node to land in the landing location.

16. The system of claim 11, wherein the network controller is further configured to identify the at least one node further based on one or more components in the at least one node that are usable in an additional node after landing.

17. The system of claim 16, further comprising the at least one node and wherein the at least one node is a high-altitude platform, and the additional node is a ground station.

18. The system of claim 16, further comprising the at least one node and wherein the additional node requires at least components for forming an additional link of the one more additional links.

19. The system of claim 11, further comprising the at least one node and wherein the at least one node includes a balloon.

20. The system of claim 11, wherein the network controller is further configured to:
    select a second node of the network based on the determined one or more additional links; and
    send flight termination instructions to the selected second node to cause the second node to terminate a flight of the second node.

* * * * *